United States Patent
Degrave

(10) Patent No.: US 6,443,006 B1
(45) Date of Patent: Sep. 3, 2002

(54) DEVICE WHICH MEASURES OIL LEVEL AND DIELECTRIC STRENGTH WITH A CAPACITANCE BASED SENSOR USING A RATIOMETRIC ALGORITHM

(75) Inventor: Kenneth A. Degrave, Wilson, MI (US)

(73) Assignee: Engineered Machined Products, Inc., Escanaba, MI (US)

(*) Notice: Subject to any disclaimer, the term of this patent is extended or adjusted under 35 U.S.C. 154(b) by 0 days.

(21) Appl. No.: 09/567,190

(22) Filed: May 9, 2000

(51) Int. Cl.[7] .......................... G02F 23/00; G08B 21/00
(52) U.S. Cl. ..................... 73/304 C; 340/620
(58) Field of Search .................. 73/304 C, 290 R; 338/38; 324/663, 674; 361/284; 340/603, 612, 620

(56) References Cited

U.S. PATENT DOCUMENTS

| | | | |
|---|---|---|---|
| 3,868,664 A | * | 2/1975 | Hill .......................... 340/244 E |
| 5,274,335 A | | 12/1993 | Wang et al. |
| 5,406,843 A | | 4/1995 | Hannan et al. |
| 5,488,311 A | | 1/1996 | Kamioka et al. |
| 5,540,086 A | | 7/1996 | Park et al. |
| 5,604,441 A | | 2/1997 | Freese et al. |
| 5,611,240 A | | 3/1997 | Yamaguchi |
| 5,613,199 A | | 3/1997 | Hannan et al. |
| 5,747,689 A | | 5/1998 | Hampo et al. |
| 5,824,889 A | | 10/1998 | Park et al. |
| 5,900,810 A | | 5/1999 | Park et al. |
| 5,907,278 A | | 5/1999 | Park et al. |
| 5,929,754 A | | 7/1999 | Park et al. |

OTHER PUBLICATIONS

Amiyo Basu Et Al., "Smart sensing" of Oil Degradation and Oil Level Measurements in Gasoline Engines, SAE Technical Paper Series, Mar. 6–9, 2000, SAE–International.

* cited by examiner

Primary Examiner—Hezron Williams
Assistant Examiner—Katina Wilson
(74) Attorney, Agent, or Firm—Brooks & Kushman P.C.

(57) ABSTRACT

A fluid level sensor and a method of operating the oil level sensor to measure the fluid level and dielectric strength of the fluid substantially simultaneously. The fluid level sensor having a compensator capacitor normally fully submerged within the fluid and a linear capacitor variably submerged as a function of fluid level. Oscillators convert the capacitance of the linear and compensator capacitors into a first and second frequency respectively. A processor uses the two frequencies and calibration data stored in a memory to calculate the fluid level and dielectric strength substantially simultaneously. The dielectric strength calculation may be based upon an offset from the second frequency from a known frequency of a known dielectric strength. The fluid level calculation may be based upon a ratio of a numerator to a denominator where the numerator is a difference between the second frequency and a second focal point frequency, and the denominator is a difference between the first frequency and a first focal point frequency.

24 Claims, 7 Drawing Sheets

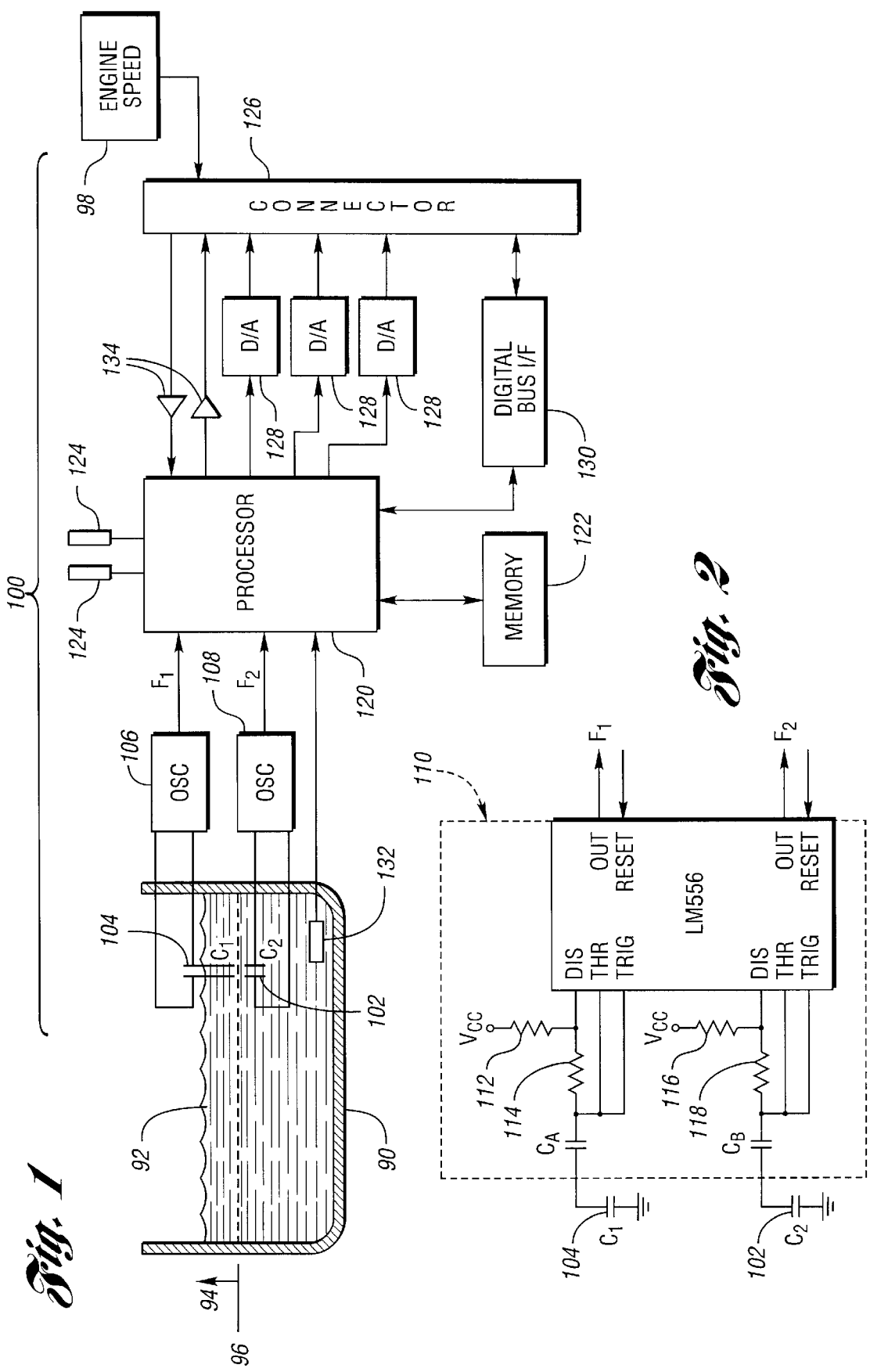

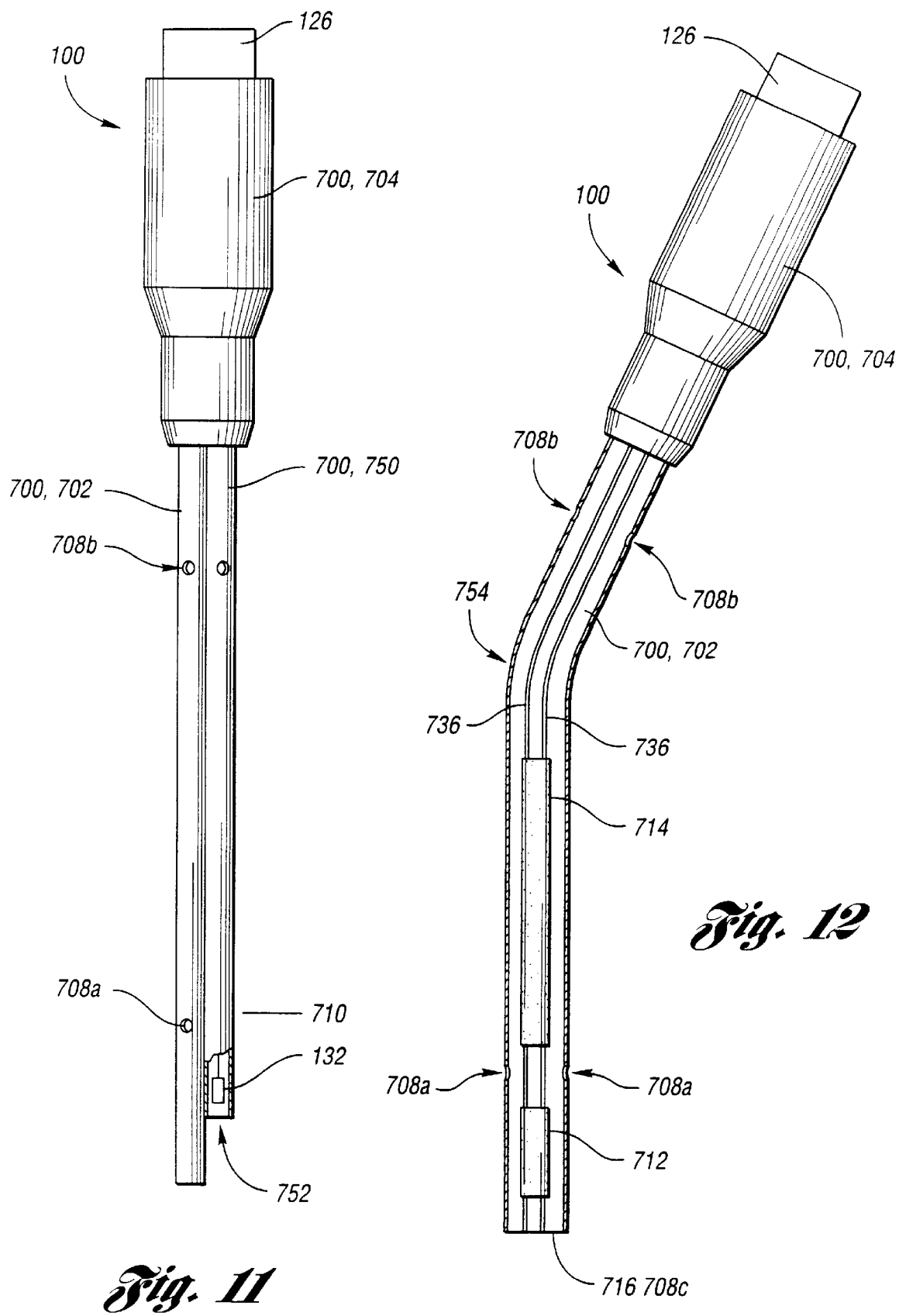

DEVICE WHICH MEASURES OIL LEVEL AND DIELECTRIC STRENGTH WITH A CAPACITANCE BASED SENSOR USING A RATIOMETRIC ALGORITHM

TECHNICAL FIELD

The present invention is related to the field of capacitive based fluid sensors used to measure fluid levels and a dielectric strength of the fluids using a ratiometric algorithm.

BACKGROUND ART

Operation of capacitive based fluid sensors is based upon a measurable change in capacitance of the sensor caused by a difference in the dielectric strength of air as compared to the dielectric strength of a fluid or oil being measured. As fluid levels rise and fall between vertical plates of the sensor, the effective dielectric strength between the plates changes, resulting in an increase or decrease in total capacitance of the sensor. Since the total capacitance is proportional to a product of the dielectric strength and the area of the plates, then given a known constant dielectric strength of the fluid or oil being measured allows the depth of the plates covered by the fluid or oil to be calculated. If the sensor is totally submerged in the fluid, then the measured capacitance can be used to calculate the actual dielectric strength of the fluid.

Capacitive based fluid sensors have found practical applications in engines, transmissions and gear boxes for machines in which the level and quality of the fluid or oil is crucial to the operation and wear of the moving parts. As level sensors, the capacitive based fluid sensors provide a real time indication of the amount of fluid or oil available. The rate at which the fluid or oil level changes can be used to distinguish between normal operational losses and a leak in the system. If the fluid or oil level drops below a predetermined level, automatic alarms or self-preservation routines can be implemented in the machinery to prevent severe damage.

When used to measure dielectric strength, the capacitive based fluid sensors can provide an indication when the fluid or oil is losing its effectiveness, and may indicate a failure in the system. Thermal breakdown of the oil over time generally results in an increase in the dielectric strength of the oil. A combination of time and change in the measured dielectric strength can be used to determine when the oil requires to be changed. Premature or sudden changes in the dielectric strength of the oil can indicate the presence of impurities in the oil. This may indicate severe problems such as engine coolant or fuel leaking around a faulty seal or gasket.

The basic design of many capacitive based fluid sensors limit their accuracy when measuring fluid levels and dielectric strengths. For example, many designs assume a constant dielectric strength when measuring fluid level. If the dielectric strength of the fluid changes with temperature and time, or if a different brand of fluid having a different dielectric strength is substituted for the original fluid, then the measured fluid level changes even though the actual fluid level remains constant. In another example, some sensor designs do not compensate for the effects of temperature on the fluid's characteristics. The dielectric strength of many fluids is dependent upon the temperature of the fluid. As fluid temperature increases, the dielectric strength increases resulting in a higher measured capacitance. Further, the volume of the fluid may also be dependent upon the temperature. When the fluid is confined in a container, a thermally induced increase in volume will result in an increase in the fluid level in the container. In yet another example, many sensor designs cannot account for the geometry of the container holding the fluid. Many containers have non-uniform shapes causing a non-linear relationship between the level of the fluid and the actual volume of fluid present in the container.

Some capacitive based fluid sensors utilize two active capacitors to mitigate the effects of changing dielectric strength on the accuracy of the fluid level measurements. U.S. Pat. No. 5,929,754 issued to Park et al. on Jul. 27, 1999 is an example of such a dual capacitor sensor. Park's sensor has a level/deterioration (dielectric) sensing capacitor plus a reference capacitor. The reference capacitor is disposed near the bottom of the sensor so that it is fully submerged in the oil during normal operation. Electronics embedded within the sensor housing use the reference capacitor to partially compensate for variations in dielectric strength over time, for dielectric strength variations between different oil brands, and for geometric changes in the sensor material due to thermal expansion. A temperature sensor is included in the design to help compensate for temperature changes.

The electronics in the Park sensor measure the capacitance of the level/deterioration capacitor and the reference capacitor and output a voltage that is proportional to the difference between the two capacitances divided by the sum of the two capacitances. Trim resistors and other fixed capacitors are used to adjust the output voltage depending upon the use of the sensor for measuring level or oil deterioration. In one embodiment, the electronics toggle the two capacitors between two sets of electronic circuits, one electronic circuit is trimmed for level, the other electronic circuit is trimmed for deterioration. One limitation of this arrangement is that an accurate deterioration (dielectric) measurement can only be made while the level/deterioration capacitor is completely submerged in the oil, and useful level measurements require the level/deterioration capacitor to be only partially submerged.

DISCLOSURE OF INVENTION

The present invention is a capacitive based fluid sensor that is capable of generating output signals proportional to a fluid or oil level above a predetermined level and a dielectric strength of the fluid or oil within a container substantially simultaneously. (From this point forward, the fluid or oil will be referred to only as an oil.) The sensor has a compensator capacitor that is disposed within the container and fully submerged within the oil. A linear capacitor of the sensor is disposed within the container so that it initially engages the oil when the oil is at a predetermined level. Both capacitors have openings that allow the oil to flow between capacitive plates of the capacitors. An electronic circuit is electrically connected to both capacitors to measure their respective capacitances. The electronic circuit calculates a dielectric strength based upon the capacitance of the compensator capacitor and an oil level based upon the capacitance of both capacitors. The calculations are performed substantially simultaneously. A temperature sensor may also be positioned to provide an oil temperature signal to the electronic circuit for use in the calculations. An engine speed signal may be provided to the electronic circuit from an external source for use in the calculations.

The capacitors are formed as coaxially cylindrical plates. An inner surface of a hollow housing forms an outer capacitive plate common to both the linear capacitor and the compensator capacitor. A first inner capacitive plate disposed adjacent to the outer capacitive plate completes the linear capacitor. A second inner capacitive plate disposed adjacent the outer capacitive plate completes the compensator capacitor. The first and second inner capacitive plates are held in position by a circuit board assembly that runs the length of the housing. The circuit board assembly is held in position by guides disposed on the inner surface of the housing. In an alternative embodiment, the first inner capacitive plate may include circumferential groves to assist the oil in wetting the plate in predetermined increments.

The housing has one or more openings of suitable size to allow the oil to enter the hollow interior of the housing. A curved section may be included in the housing to allow the sensor to fit into tight locations.

In one embodiment, the electronic circuit includes two oscillators, with one oscillator connected to each of the linear capacitor and the compensator capacitor respectively. The frequency of the oscillators are inversely proportional to the capacitance of the respective capacitors. An advantage of using one oscillator for each capacitor is that both capacitor/oscillator combinations are electrically isolated from each other. A failure of one capacitor/oscillator combination does not necessarily disrupt operation of the other capacitor/oscillator combination. A processor, generally a microprocessor or microcontroller, connected to the outputs of the two oscillators calculates the dielectric strength and oil level. Programming pins connected to the processor, and a memory may be used to load calibration and other characteristics into the electronic circuit for use in the calculations. One or more digital to analog converters may be connected to the processor to convert the dielectric strength and oil level from digital form to analog form. Alternatively, the dielectric strength and oil level may be output in parallel or serial digital form.

Calculation of the oil level and dielectric strength are based upon a plot of the sensor's characteristics curves using the frequency associated with the linear capacitor (called a first frequency) as the X-axis and the frequency associated with the compensator capacitor (called a second frequency) as the Y-axis. Each curve of the sensor's characteristic curves intersect at a focal point where the dielectric strength has a value of one. Near this focal point the individual oil level curves are approximately straight lines, each with a unique slope. Each point of the characteristic curve represents an oil level and a dielectric strength. After measuring the first frequency and the second frequency, then the oil level and dielectric strength can be determined from the characteristic curves.

In an alternative embodiment, the oil level calculation determines a difference between the focal point and the first frequency to produce a denominator, and a difference between the focal point and the second frequency to produce a numerator. Calculating a ratio of the numerator to the denominator produces a measured slope that indicates the oil level.

In another alternative embodiment, the dielectric strength calculation is based upon the difference between the second frequency and a known characteristic of a known dielectric strength. A scale factor and offset may be included in the calculation as necessary.

Diagnostics may be performed by the processor to detect, signal and compensate for failures of the capacitors, wiring and some of the electronics. One error detection is accomplished by checking the first frequency and the second frequency against valid frequency bands. A second error detection is accomplished by checking the denominator for a zero value prior to calculating the ratio of the numerator to the denominator. A third error detection is accomplished by checking the calculated ratio against a valid ratio range. If any one or more errors are detected, an error signal may be generated by the processor. Error detection filtering may be applied to minimize spurious errors.

Accordingly, it is an object of the present invention to provide a capacitive based oil sensor that is capable of measuring and reporting the level of the oil and the dielectric strength of the oil substantially simultaneously.

Another object of the present invention is to provide a method of calculating the oil level and dielectric strength using a ratiometeric algorithm.

These and other objects, features and advantages will be readily apparent upon consideration of the following detailed description in conjunction with the accompanying drawings.

BRIEF DESCRIPTION OF DRAWINGS

FIG. 1 is an electrical block diagram of a sensor implementing the present invention;

FIG. 2 is schematic of two oscillators used within the sensor;

FIG. 11 is a side view of a second embodiment of the sensor including a temperature sensor; and FIG. 12 is a partial cut-away side view of an a third embodiment of the sensor including a curved section.

BEST MODE FOR CARRYING OUT THE INVENTION

Figure 3:
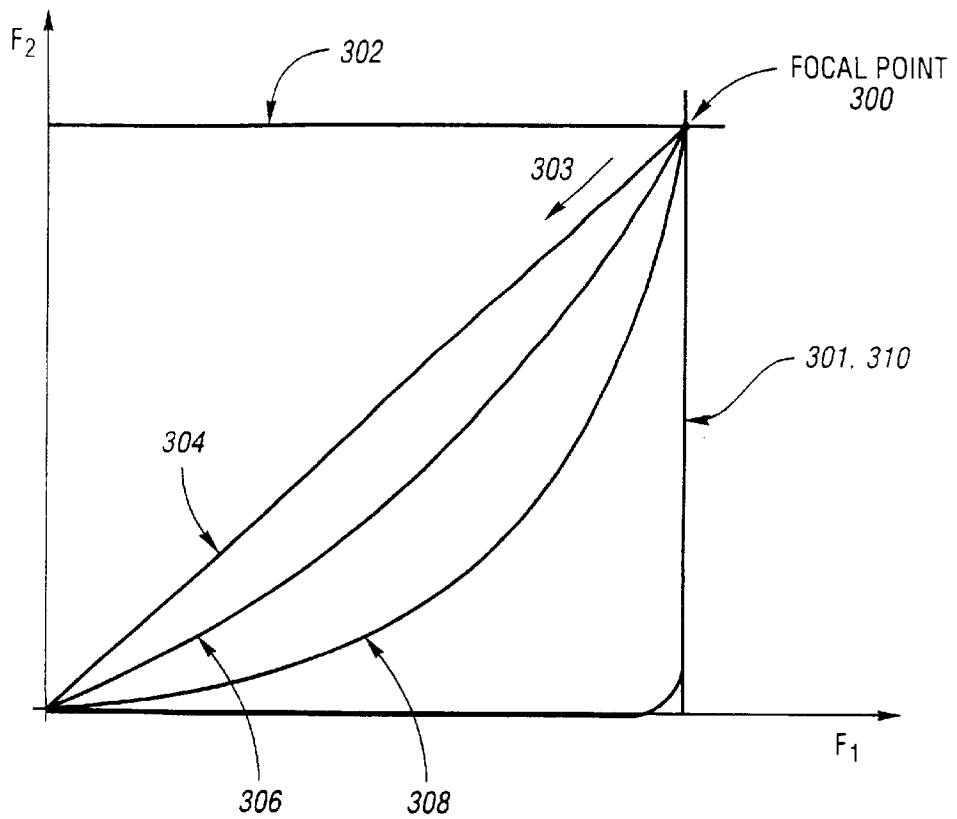
FIG. 3 is a plot of the sensor's characteristics.

FIG. 1 is an electrical block diagram of a sensor 100 implementing the present invention. A container 90 holding an oil 92 is included in the figure to show the physical placement of portions of the sensor 100 with respect to the oil 92. The oil 92 fills the container 90 to an oil level, as indicated by arrow 94 above a predetermined level, indicated by line 96. The predetermined level 96 is a maximum depth of the oil 92 within the container 90 at which the sensor 100 outputs a zero value for the oil level 94.

The sensor 100 has two capacitive elements, a compensator capacitor 102 and a linear capacitor 104. The compensator capacitor 102 and linear capacitor 104 are positioned inside the container 90. Each capacitor 102 and 104 consists of at least two capacitive plates. Each capacitive plate has a horizontal dimension or width and a vertical dimension or height. The capacitance of each capacitor 102 and 104 is proportional to a product of the height of the capacitive plates and the effective dielectric constant of the air and/or oil that resides between the capacitive plates. Where the capacitive plates are simple rectangles of height H and width W separated distance D, $\in_0$ is the permittivity of free space, and K is the effective dielectric strength of the space between the capacitive plates, then capacitance is given by equation 1 as:

$$C = \in_0 K\, W H/D \tag{1}$$

When the oil 92 exists at a level L between the capacitive plates, as measured from the bottom of the capacitive plates, and the oil 92 has a dielectric strength of $K_{OIL}$, and the air has a dielectric strength of $K_{AIR}$, (normally $K_{AIR}=1.0005$) then the capacitance is given by equation 2 as:

$$C = \in_0 W(K_{OIL} L + K_{AIR}(H-L))/D \tag{2}$$

The compensator capacitor 102 is positioned in the container 90 below the predetermined level 96 so that it is normally fully submerged in the oil 92. This means that the level L of the oil 92 between the compensator capacitor's capacitive plates is equal to the height H of the capacitive plates. As a result, the capacitance of the compensator capacitor 102 is given by equation 3 as:

$$C = \in_0 K_{OIL} W H/D \tag{3}$$

Note that in equation 3 the capacitance is independent of the oil level 94 above the predetermined level 96. In practice, however, the fringing effects at the edges of the compensator capacitor's capacitive plates will result in a slight dependency of the capacitance on the oil level 94. Also note that the dielectric strength of the oil $K_{OIL}$ is the only variable on the right side of equation 3.

The linear capacitor 104 is located inside the container 90 so that the bottom of its capacitive plates are at or slightly above the predetermined level 96 As the oil level 94 above the predetermined level 96 increases and the oil 92 moves between the linear capacitor's capacitive plates, the capacitance of the linear capacitance 104 is given by equation 2 where L is the oil level 94 above the predetermined level 96, and H is the height of the linear capacitor's capacitive plates.

Linear capacitor 104 is electrically connected to a first oscillator 106 such that the first oscillator oscillates at a first frequency $F_1$ that is inversely proportional to the capacitance of the linear capacitor 104. From this point forward, the capacitance of the linear capacitor 104 will be called a first capacitance having a value of $C_1$. Likewise, the compensator capacitor 102 is electrically connected to a second oscillator 108 such that the second oscillator oscillates at a second frequency $F_2$ that is inversely proportional to the capacitance of the compensator capacitor 102. From this point forward, the capacitance of the compensator capacitor 102 will be called a second capacitance having a value of $C_2$. An advantage is realized by connecting each capacitor 102 and 104 to a different oscillator 106 and 108. By electrically isolating at least one node of each capacitor 102 and 104 from each other, then a failure in one capacitor 102 or 104 does not necessarily induce a failure in the other.

In the preferred embodiment, the first oscillator 106 and the second oscillator 108 are implemented in a dual monostable oscillator 110 such as an LM556 dual timing circuit available from National Semiconductor of Santa Clara, Calif. FIG. 2 is a schematic showing the compensator capacitor 102 and linear capacitor 104 connected to the dual mono-stable oscillator 110. The first frequency is determined by the charge rate of the linear capacitor 104 through resistors 112 and 114 and the discharge rate through resistor 112. The second frequency is determined by the charge rate of the compensator capacitor 102 through resistors 116 and 118, and the discharge rate through resistor 116.

Returning to FIG. 1, the first frequency and second frequency are sent from the first and second oscillators 106 and 108 respectively to a processor 120. The processor 120 may be a microprocessor, microcontroller, or any other algorithmic logic unit capable of performing math and logic operations. Processor 120 uses the first and second frequencies to calculate the dielectric strength of the oil 92 and the oil level 94 above the predetermined level 96. A memory 122 either external to the processor 120, as shown in FIG. 1, or internal to the processor 120 is included to assist the processor 120 in the calculations and storage of calibration data associated with the calculation. Preferably, memory 122 is a non-volatile type memory so that it can retain the calibration data while the sensor 100 in unpowered.

Calibration data is entered into the processor 120 and memory 122 through programming pins 124. A connector 126 is used to bring electrical power (not shown) into the sensor 100 and carry other information to and from the sensor 100.

One or more digital to analog converters 128 may be used to convert the calculated dielectric strength and calculated oil level from digital form to analog form. Outputs from the digital to analog converters 128 are wired to the connector 126. In an alternative embodiment, a digital bus interface 130 may be connected to the processor 120 to output the dielectric strength and oil level in digital form on a serial or parallel digital bus wired through the connector 126.

A temperature sensor 132 may be positioned within the container 90 below the predetermined level 96 to measure an oil temperature. The output of the temperature sensor 132 is a value of TOIL. The temperature sensor 132 is electrically connected to an input of the processor 120 to make $T_{OIL}$ available to the processor 120. The processor 120 uses $T_{OIL}$ in calculating the dielectric strength and oil level 94 to account for thermally induced variations in the first frequency and the second frequency. Such variations may be caused by thermal expansion and temperature dependent dielectric strength properties of the oil 92, by thermal expansion of the materials used to fabricate the linear capacitor 104 and compensator capacitor 102, and by variations in the amount of oil 92 pulled into an engine (not shown) as a function of temperature.

One or more buffers 134 may be connected to discrete inputs and outputs of the processor 120 to allow the processor 120 to receive and send various analog and logical signals. Typical logical signals may include diagnostic error signals, alarms, clocking signals, status, reset commands, and the like. Error signals will be discussed in more detail later.

An example of an analog signal is an engine speed signal provided by a source 98 external to an input buffer 134. In an alternative embodiment, the digital bus interface 130 may be used as the input for the engine speed signal. The processor 120 uses the engine speed signal to adjust the oil level 94 to account for variations in the amount of oil 92 pulled into an engine as a function of engine speed. In general, increasing the engine speed increases causes more oil 92 to be pulled from the container 90 and into the engine.

Calculations of the dielectric strength and oil level 94 may be performed in several different ways. One method works on the principle that the second frequency is inversely proportional to the second capacitance due to a conversion function of the second oscillator 108. The second capacitance can be calculated by measuring the second frequency and applying the measured second frequency to an inverse of the conversion function of the second oscillator 108. Dielectric strength of the oil 92 can then be calculated from the second capacitance and the geometry of the compensator capacitor 102. In similar calculations, the first capacitance of the linear capacitor 104 can be determined from the first frequency. Knowing the first capacitance, the geometry of the linear capacitor 104, and the dielectric strength of the oil 92, the oil level 94 can be calculated.

The preferred method of calculating the dielectric strength of the oil 92 is based upon a difference between the second frequency and a known frequency of a known dielectric strength. Calculation of the oil level 94 is based upon a ratio of a difference in the second frequency from a reference frequency, also called a focal point, over a difference between the first frequency from the reference frequency. This ratiometeric method is preferred for calculating the oil level 94 since it is insensitive to the actual dielectric strength of,the oil 92.

Another method of calculating the dielectric strength of the oil 92 is based upon characteristic curves as will be shown below.

FIG. 3 is a graph showing the product of the dielectric strength and oil level 94 plotted against the first frequency (X-axis)and the second frequency (Y-axis) as measured by an ideal sensor having no fringe fields or parasitic capacitances. This graph is referred to as a characteristic curve of the sensor. The dielectric strength of a vacuum has a value of one. Typical dielectric strength values for motor oil range from approximately 1.6 to approximately 3.2. Consequently, the compensator capacitor 102 and linear capacitor 104 have the smallest, or minimum values of capacitance when there is only air between the capacitive plates. The minimum values for the first and second capacitances result in maximum values for the first and second frequencies respectively. A focal point 300 is defined at the intersection of a vertical line 301 indicative of the maximum first frequency, and a horizontal line 302 indicative of the maximum second frequency. X and Y values for the focal point 300 are also called a first focal point frequency and a second focal point frequency respectively.

If the air between the capacitive plates of the compensator capacitor 102 and linear capacitor 104 are replaced by an oil 92 with a dielectric strength having a value of one, then the sensor 100 would operate at the focal point 300. Here, both the compensator capacitor 102 and linear capacitor 104 behave in accordance with equation 3 so both the first frequency and second frequency are inversely proportional to the dielectric strength of the oil 92. As the dielectric strength increases, as shown by arrow 303, the first and second frequencies decrease toward zero along line 304.

The linear capacitor 104 behaves in accordance with equation 2 when the oil level 94 is below the top of the capacitive plates of the linear capacitor 104. As a result, small increases in the dielectric strength of the oil 92 have a smaller effect on the first frequency than the second frequency. This causes line 304 to become curved, as shown by line 306. Decreasing the oil level 94 further causes the linear sensor 104 to be even less sensitive to the dielectric strength of the oil 92 and more sensitive to the dielectric strength of the air, resulting in line 308. The theoretical limit where there is only air between the capacitive plates of the linear capacitor 104 is the horizontal line 310. Along horizontal line 310 the first frequency is independent of the dielectric strength of the oil 92. Each line 304 and 310 and each curve 306 and 308 represent the characteristics of the sensor 100 at a different oil level 94 over all dielectric strengths greater than or equal to one.

Figure 4:
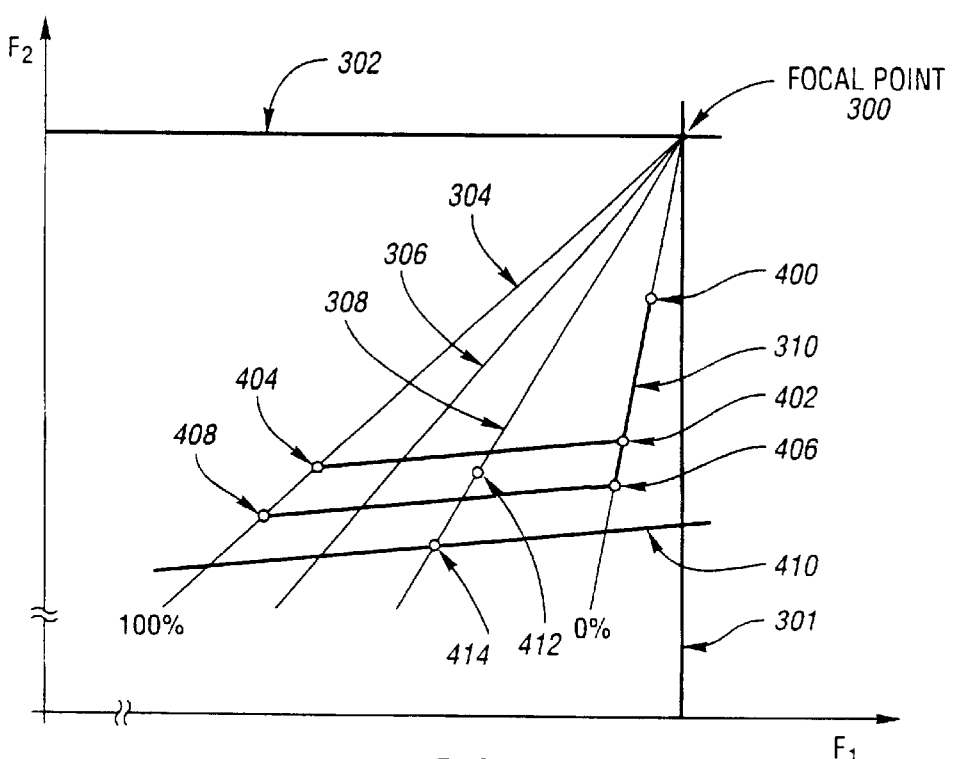
FIG. 4 is a plot of the sensor's characteristics near a focal point in the plot.

FIG. 4 is a graph showing a region of the characteristic curve around the focal point 300 and takes into account non-ideal characteristics of the linear capacitor 104 and compensator capacitor 102. In this region, curves 306 and 308 are approximately straight lines. Each line 304, 306, 308 and 310 has a unique slope that indicates a unique oil level 94.

For the following paragraphs it is assumed that the dielectric strength of the oil 92 is a constant greater than one. When the oil level 94 is at the bottom of the compensator capacitor 102, the compensator capacitor 102 and linear capacitor 104 have air between their capacitive plates. Ideally, the operating point of the sensor 100 should be at the focal point 300, but in reality it does not. Fringe fields extend from the bottom of the compensator capacitor 102 into the oil 92 causing a slight increase in the value of the second capacitance. This results in a slight decrease in the maximum second frequency from the second focal point frequency. Fringe fields extending below the linear capacitor 104, and parasitic capacitance between the linear capacitor 104 and compensator capacitor 102 also result in a slight increase in the first capacitance. This results in a slight decrease in the maximum first frequency from the first focal point frequency. In reality, the sensor 100 operates at point 400 when it is just above the oil 92.

As the level of the oil 92 increases, the second capacitance increases causing the second frequency to increase until the oil 92 is at the predetermined level 96 and completely fills the compensator capacitor 102. Here, the second frequency is at point 402 on the graph. Non-ideal characteristics of the linear capacitor 104 and parasitic capacitances also result in point 402 being shifted slightly left of point 400. Further increases in the oil level 94 above the predetermined level 96 cause the oil 92 to engage the linear capacitor 104 resulting in a decrease in the first frequency. At point 404 (100% oil level) on line 304 the oil 92 completely covers the linear capacitor 104. Note that point 404 is shifted to a slightly lower second frequency than point 402 due to parasitic capacitances and non-ideal characteristics of the compensator capacitor 102.

An increase in the dielectric strength of the oil 92 above the constant value assumed above causes point 402 (0% oil level) to shift downward along line 310 to point 406. Likewise, point 404 (100% oil level) shifts downward along line 304 to point 408. Note that the slope of line segment 402 to 404 is the same as for the line segment 406 to 408. In general, the slope of all lines and line segments plotted for constant dielectric strengths are the same. Line 410 represent a known characteristic of a known dielectric strength. Line 410 is used in the preferred embodiment for calculating the unknown dielectric strength of the oil 92 being measured.

Dielectric strength and oil level 94 above the predetermined level 96 may be determined directly from the sensor's characteristic curve. Here, the characteristic curve is represented a series of discrete coordinates, one coordinate for every practical combination of first frequency and second frequency that falls in a triangle defined by line 304, line 310, and a line for a known maximum dielectric strength (similar to line 410) of the oil 92. For each coordinate within the triangle, a level and dielectric strength can be predetermined and stored in the memory 122. Once the first frequency and second frequency have been measured, they are combined to create a coordinate, and then the associated dielectric strength and level of the oil 92 above the predetermined level 96 for that coordinate may be read from the memory 122.

In an alternative embodiment, the characteristic curve stored in memory 122 may only be the focal point 300 and multiple points along a known dielectric strength, line 410 for example. From this information, various slopes and/or each coordinate with the triangle can be calculated for later use in determining the oil level 94 and dielectric strength of the oil 92.

Figure 5:
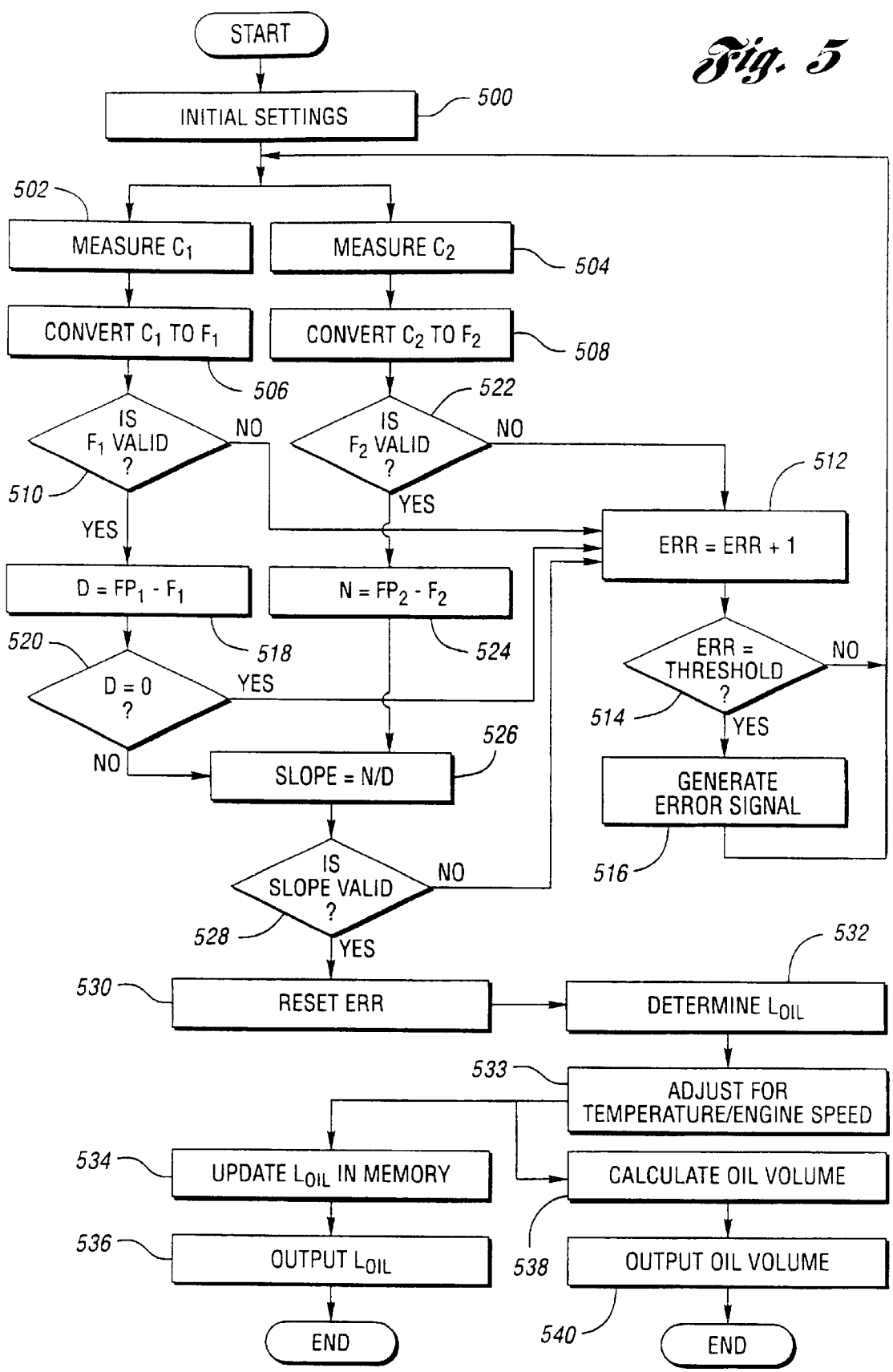
FIG. 5 is a flow diagram of a method for calculating an oil level.

FIG. 5 is a flow diagram of a method of calculating the oil level 94 above the predetermined level 96 using the graph of FIG. 4 and the schematic of FIG. 1. This method starts in block 500 with providing initial settings that include the valid second frequency band for the second frequency $F_2$, a valid first frequency band for the first frequency $F_1$, a default value for the second frequency $F_2$, a valid ratio range for the slopes of the lines 304–310 from FIG. 4, a first focal point frequency $FP_1$, a second focal point frequency $FP_2$, and an initial value for an error counter ERR. First and second oscillators 106 and 108 then measure the first $C_1$ and second $C_2$ capacitances, as indicated in blocks 502 and 504, and convert them into the first $F_1$ and second $F_2$ frequencies respectively, as shown in blocks 506 and 508. These measurements and conversions take place substantially simultaneously in the preferred embodiment.

Processor 120 checks the first frequency $F_1$ against the valid first frequency band, as shown by decision block 510. If the first frequency $F_1$ is too high or too low, the NO branch of decision block 510, then the error counter ERR is incremented, as shown in block 512. The error counter ERR is then checked against a threshold value, as shown by decision block 514. Where the error counter ERR is below the threshold value, the NO branch of decision block 514, then restart the routine. When the error counter ERR equals the threshold value, the YES branch of decision block 514, then an error signal is generated, as shown in block 516.

If the first frequency $F_1$ is within the valid first frequency band, the YES branch of decision block 510, then a difference is calculated between the first frequency $F_1$ and the first focal point frequency $FP_1$ to produce a denominator D, as shown in block 518. The denominator D is then tested for a zero value by decision block 520.

Processor 120 also checks the second frequency $F_2$ against the valid second frequency band, as shown by decision block 522. If the second frequency $F_2$ is within the valid second frequency band, the YES branch of decision block 522, then the numerator is then calculated as a difference in the second focal point frequency $FP_2$ and the second frequency $F_2$, as shown in block 524.

If the second frequency $F_2$ is too high or too low, the NO branch of decision block 522, then the error counter ERR is incremented, as shown in block 512. The error count ERR is then checked against the threshold value, as shown by decision block 514.

A ratio of the numerator to the denominator is calculated to produce a measured slope, as shown in block 526. In decision block 528, the measured slope, is checked against the valid ratio range. If the measured slope is within the valid ratio range, the YES branch of decision block 528, then the error counter ERR is reset, as shown in block 530. The measured slope is then used to determine a level $L_{OIL}$ based upon the sensor's characteristic curve, as shown in block 532. Adjustments to the level $L_{OIL}$ to account for temperature and engine speed are then made, as shown in block 533. Level $L_{OIL}$ is then updated in memory 122, as shown in block 534. Finally, the level $L_{OIL}$ is output from the processor 120, as shown in block 536. If the slope is invalid, the NO branch of decision block 528, then the error counter ERR is incremented, as shown in block 512.

A profile of the container 90 as a function of the oil level 94 above the predetermined level 96 may be entered through the programmable pins 124 and stored in the memory 122. The profile may be in the form of an equation or lookup table that converts the oil level 94 above the predetermined level 96 into a volume of the oil 92. The profile may also be a function of the oil temperature $T_{OIL}$ if required. After the level $L_{OIL}$ has been adjusted for temperature $T_{OIL}$ and engine speed effects, as shown in block 533, the level $L_{OIL}$, profile is used to calculate the volume of the oil 92, as shown in block 538. An output of the processor 120 for the volume of the oil 92 is then updated, as shown in block 540.

Figure 6:
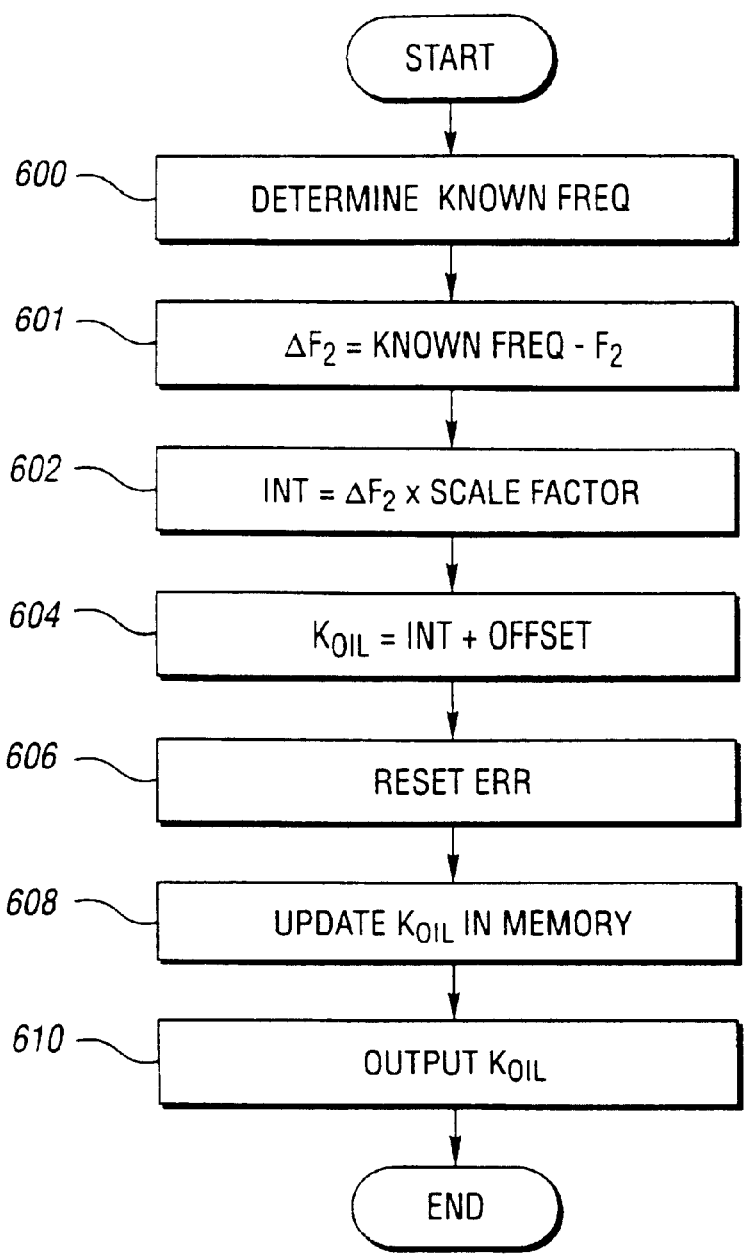
FIG. 6 is flow diagram of a method for calculating a dielectric strength.

FIG. 6 is a flow diagram of a method for calculating the dielectric strength of the oil 92 using the characteristic curve of FIG. 4 and the schematic of FIG. 1. Initial settings for this method include a known characteristic for a known dielectric strength (for example line 410), a scale factor and a offset. This method starts from a point where processor 120 has already calculated a valid slope from measured $C_1$ and $C_2$. In the preferred embodiment, this starting point is the YES branch of decision block 528 shown in FIG. 5. Point 412 in FIG. 4 will be used as an example of a measured point for an oil 92 having an unknown dielectric strength. The method shown in FIG. 5 has already determined a slope of a line passing through point 412. In the example, line 308 passes through point 412.

The method shown in FIG. 6 starts by determining a known second frequency (KNOWN FREQ) for a point 414, as shown in block 600. Point 414 is the point where known line 410 and line 308 intersect. Since point 412 and point 414 are one the same line 308, then they represent the same oil level 94 but have two different dielectric strengths. Point 414, however, is on line 410 and thus has a known dielectric strength. Processor 120 then calculates a frequency difference $\Delta F_2$ between the second frequency $F_2$ of the measured point 412 and the second frequency (KNOWN FREQ) of point 414, as shown in block 601. The delta second frequency $\Delta F_2$ is multiplied by the scale factor to produce an intermediate result INT, as shown in block 602. The intermediate result INT is added to the offset to produce the calculated dielectric strength $K_{OIL}$, as shown in block 604. Error counter ERR (from FIG. 5) may then be reset, as shown in block 606. The value of the calculated dielectric strength $K_{OIL}$ stored in memory 122 is updated, as shown in block 608. Finally, an output of the processor 120 is updated with the calculated dielectric strength $K_{OIL}$, as shown in block 610.

Figure 7:
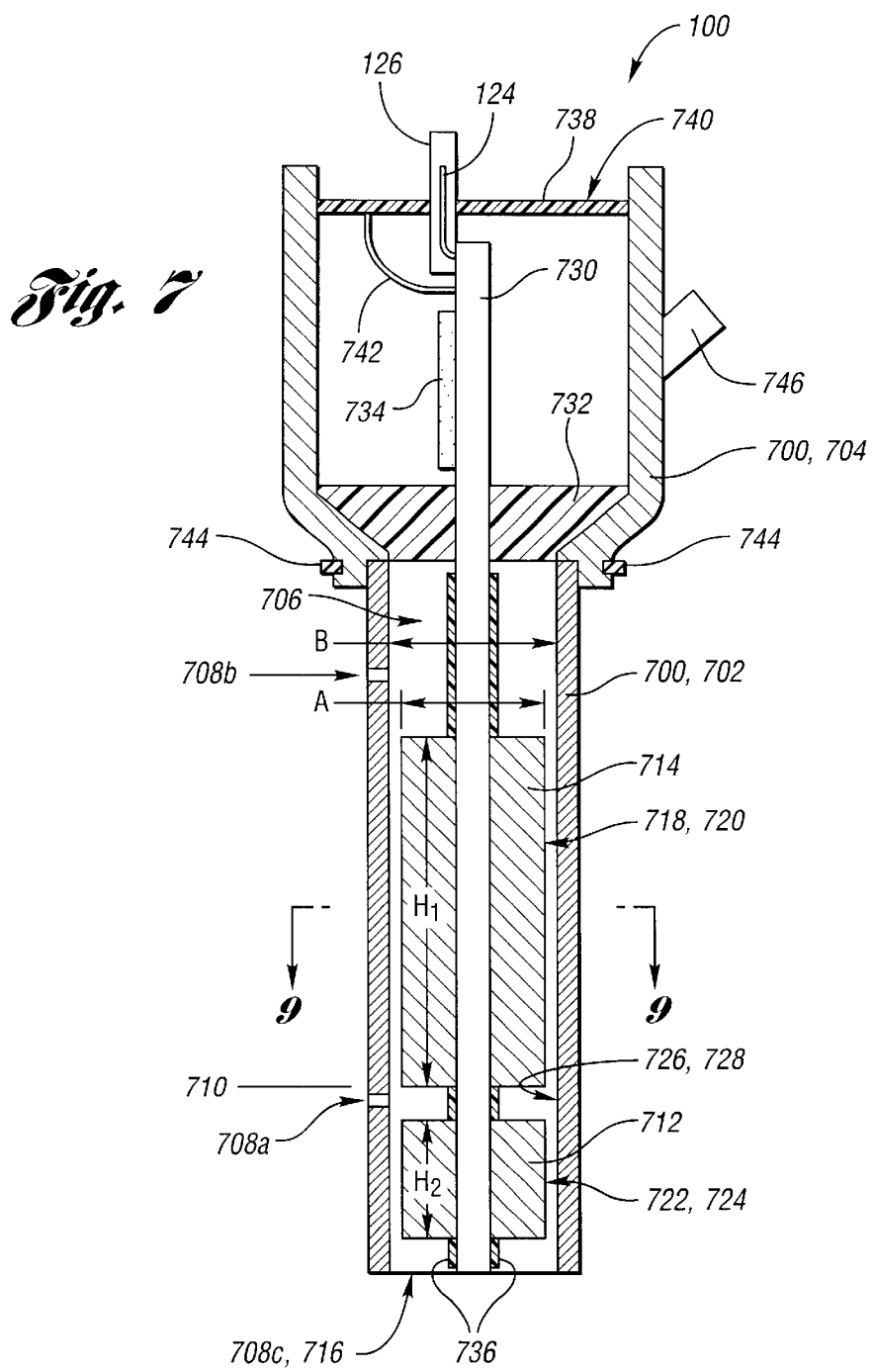
FIG. 7 is a cross-sectional side view of the sensor.
Figures 8, 10:
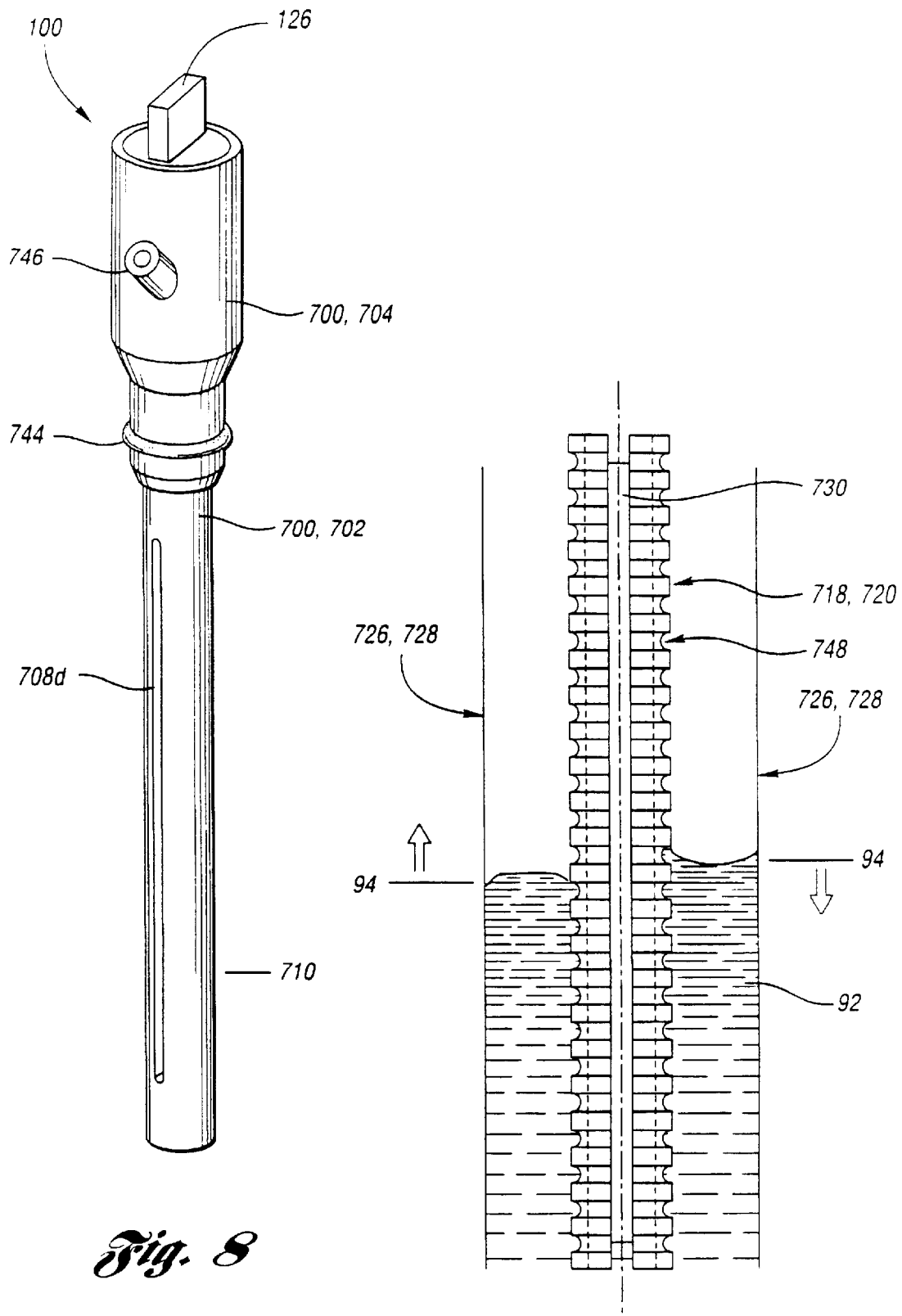
FIG. 8 is a perspective view of the sensor with a slit opening.
FIG. 10 is a side view of a linear capacitor having grooves.

A cross-sectional view of the sensor 100 is shown in FIG. 7. The sensor 100 has a housing 700 that comprises an extrusion 702 welded to a body 704. Extrusion 702 has a hollow interior 706 having one or more openings 708 that allow the oil 92 to enter and exit. In the preferred embodiment, a first opening 708a is located at or slightly below a predetermined location 710 between a compensator slug 712 and a linear slug 714. The predetermined location 710 is meant to align with the predetermined level 96 when the sensor 100 is installed in the container 90. First opening 708a allows oil 92 to fill the interior 706 of the extrusion 702 to a sufficient level to submerge the compensator slug 712. A second opening 708b is located above the linear slug 714. The second opening 708b permits air to exit and enter the interior 706 of the extrusion 702 as oil 92 enters and exits respectively. A third opening 708c is the bottom 716 of the extrusion 702 to allow the oil 92 to be fully drained from the extrusion 702 if required. In an alternative embodiment, the opening 708d may be a slit running the length of the extrusion 702, as shown in FIG. 8.

Linear slug 714 has an exterior surface 718 having a diameter of A meters and a height of $H_1$ meters. This exterior surface 718 defines a first inner capacitive plate 720 that is part of the linear capacitor 104. Compensator slug 712 also has an exterior surface 722 having the diameter of A meters and a height of $H_2$ meters. This exterior surface 722 defines a second inner capacitive plate 724 that is part of the compensator capacitor 102. An interior surface 726 of the extrusion 702 has an inner diameter of B meters and a height that ranges from above the linear slug 714 to below the compensator slug 712. The interior surface 726 defines an outer capacitive plate 728. A combination of the first inner capacitive plate 720 and the outer capacitive plate 728 produces the linear capacitor 104. A combination of the second inner capacitive plate 724 and the outer capacitive plate 728 produces the compensator capacitor 102. Capacitances of the compensator capacitor 102 and linear capacitor 104 are given by equation 4 as:

$$C_x = 2\pi \epsilon_o H_x / ln(B/A) \tag{4}$$

where "x" equals "1" for the linear capacitor 104 and "2" for the compensator capacitor 102.

The compensator slug 712 and the linear slug 714 are mounted on a circuit board assembly 730. Circuit board assembly 730 extends from the bottom of the extrusion 702, through a seal 732, and into the body 704. An electronic circuit 734 that includes the first and second oscillators 106 and 108, the processor 120, memory 122, digital to analog converter 128 and digital bus interface 130 is mounted on a portion of the circuit board assembly 730 inside the body 704. Connector 126 and the programming pins 124 are also mounted on the circuit board assembly 730 and positioned to protrude up and out of the body 704. Electrical connections between the electronic circuit 734 and the linear slug 714 and the compensator slug 712 are provided by electrically conductive traces (not shown) on the circuit board assembly 730.

Figure 9:
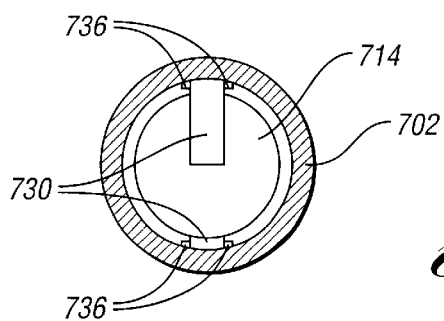
FIG. 9 is a cross-sectional top view of the sensor taken through the linear capacitor.

Positioning of the circuit board assembly 730 within the hollow interior 706 of the extrusion 702 is provided by a four guides 736 attached or formed on the interior surface 726 of the extrusion 702. All four guides 736 are show in a cross-sectional view of FIG. 9. The guides 736 permit the circuit board assembly 730 to be slid into position within the extrusion 702 so the linear slug 714 and the compensator slug 712, which are attached to the circuit board assembly 730, can be centered in the extrusion.

A retainer ring 738 disposed within a seat 740 holds the circuit board assembly 730 inside the housing 700. The retainer ring 738 is attached to the electronic circuit 734 through a ground wire 742. The ground wire 742 provides an electrical ground path between the electronic circuit 734 and the outer capacitive plate 728 through the body 704 and extrusion 702. Once the circuit board assembly 730 has been secured by the retainer ring 738, the body 704 is filled with a potting material to seal the electronic circuit 734 and wiring from the environment.

An O-ring 744 is provided on the body 704 to allow the sensor 100 to form a oil-tight seal with the container 90. A mounting bracket 746 is also disposed on the body 704 to provide a means for connecting the sensor 100 to a surrounding support structure (not shown).

Since the electronic circuit 734 operates in the digital domain, the calculated level $L_{OIL}$ has a minimum step resolution of one least significant bit. This least significant bit can sometimes toggle at random when the oil level 94 is half way between least significant bits. Circumferential grooves 748 may be formed into the exterior surface 718 of the linear slug 714, as shown in FIG. 10, to help minimize the probability of the least significant bit toggling. Referring to the left side of FIG. 10, the oil 92 adheres to corners formed where the grooves 748 intersect the exterior surface 718 as the oil level 94 rises. This corner adherence hinders upward movement of the oil 92 against the exterior surface 718. Once the corner adherence is broken, the oil 92 wets the exterior surface 718 up to the next groove 748. From a linear capacitor point of view, it appears as though the oil level 94 increases in a predetermined increment. Referring to the right side of FIG. 10, as the oil level 94 falls, the corner adherence hinders a downward movement of the oil 92 against the exterior surface 718. Once the corner adherence is broken, the oil 92 flows down the exterior surface 718 to the next groove 748. Here, the oil level 94 appears to decrease by the predetermined increment. In the preferred embodiment, the grooves 748 are 1/64th of an inch in radius, and are spaced every 1/16th of an inch vertically. Ideally, although not necessarily, the grooves 748 are sufficiently small so as not to make a difference in the first capacitance of the linear capacitor 104.

Temperature sensor 132 is mounted within the housing 700 below the predetermined location 710 so that it is normally submerged in the oil 92. FIG. 11 is shows the preferred embodiment where the temperature sensor 132 is mounted within a tube 750 adjoining the extrusion 702. This arrangement provides excellent electromagnetic isolation between the temperature sensor 132 in the tube 750 and the compensator capacitor 102 and linear capacitor 104 in the extrusion 702. Tube 750 includes at least one opening 752 to allow the oil 92 to enter and exit. The at least one opening 752 may be a slit similar to the slit type opening 708d shown in FIG. 8, or multiple openings similar to openings 708a and 708b as shown in FIG. 11. Other mounting arrangements for the temperature sensor 132 may be used within the scope of the present invention. What is important is that the temperature sensor 132 is normally positioned below the predetermined level 96 within the container 90 to engages the oil 92.

An advantage of positioning the compensator slug 712 and the linear slug 714 within the extrusion 702 using the circuit board assembly 730 is that the circuit board assembly 730 is not required to be planar. FIG. 12 shows an alternative embodiment of the sensor 100 where there the extrusion 702 has a curved section 754. In this embodiment, the bottom 716 of the extrusion 702 is open to allow insertion of the circuit board assembly 730 during sensor assembly. Each portion of the circuit board assembly 730 that reaches the curved section 754 during sensor assembly is flexed by the guides 736 to follow the curved section 754. This gives the fully assembled sensor 100 an ability to be mounted in tight, non-linear locations.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A sensor for measuring a dielectric strength and a level of a fluid above a predetermined level in a container, the sensor comprising:

a linear capacitor disposed within the container to engage the fluid while the level of the fluid is above the predetermined level, the linear capacitor having a first capacitance that is sensitive to the dielectric strength and the level of the fluid above the predetermined level;

a compensator capacitor disposed within the container and submerged in the fluid when the level of the fluid is at least as high as the predetermined level, the compensator capacitor having a second capacitance that is sensitive to the dielectric strength of the fluid and an electronic circuit including a first oscillator electrically connected to the linear capacitor to convert the first capacitance into a first frequency, a second oscillator electrically connected to the compensator capacitor to convert the second capacitance into a second frequency, and a processor electrically connected to the first oscillator and the second oscillator, the processor being operational to calculate the dielectric strength and the level of the fluid above the predetermined level substantially simultaneously based upon the first frequency and the second frequency.

2. The sensor of claim 1 wherein the electronic circuit further comprises at least one digital to analog converter electrically connected to the processor to convert the dielectric strength and the level of the fluid above the predetermined level into a respective analog form.

3. The sensor of claim 1 wherein the electronic circuit further comprises a plurality of programming pins electrically connected to the processor to enter at least one calibration parameter for use in calculating the dielectric strength and the level of the fluid above the predetermined level.

4. The sensor of claim 1 wherein the electronic circuit further comprises a memory connected to the processor, the memory storing a profile for converting the level of the fluid above the predetermined level into a volume of fluid for the container, and the processor being further operational to calculate the volume of fluid in the container as a function of the level of the fluid above the predetermined level and the profile of the container.

5. The sensor of claim 1 further comprising a temperature sensor disposed within the container, engaging the fluid, and connected to the electronic circuit, the temperature sensor converting a temperature of the fluid into a fluid temperature signal that is used by the electronic circuit in calculating the dielectric strength and the level of the fluid above the predetermined level.

6. The sensor of claim 1 further comprising an input connected to the electronic circuit, the input receiving an engine speed signal that is used by the electronic circuit in calculating the level of the fluid above the predetermined level.

7. The sensor of claim 1 wherein the linear capacitor and the compensator capacitor each have a first node, and the electronic circuit electrically isolates the first nodes from each other.

8. A sensor for measuring a dielectric strength and a level of a fluid, the sensor comprising:

a housing having an interior, at least one opening of suitable size to permit the fluid to enter the interior, and a predetermined location that defines a zero value for the level of the fluid, the interior having a surface that defines an outer capacitive plate;

a first inner capacitive plate disposed within the housing above the predetermined location, the first inner capacitive plate and outer capacitive plate forming a first capacitance that is sensitive to the dielectric strength and the level of the fluid in the interior of the housing above the predetermined location;

a second inner capacitive plate disposed within the housing below the predetermined location, the second inner capacitive plate and the outer capacitive plate forming a second capacitance that is sensitive to the dielectric strength of the fluid in the interior of the housing below the predetermined location; and an electronic circuit including a first oscillator electrically connected to the first inner capacitive plate and the outer capacitive plate to convert the first capacitance into a first frequency, a second oscillator electrically connected to the second inner capacitive plate and the outer capacitive plate to convert the second capacitance into a second frequency, a processor electrically connected to the first oscillator and the second oscillator, the processor being operational to calculate the dielectric strength and the level of the fluid above the predetermined location substantially simultaneously based upon the first frequency and the second frequency.

9. The sensor of claim 8 further comprising a temperature sensor disposed within the housing below the predetermined location and electrically connected to the electronic circuit, the temperature sensor converting a temperature of the fluid into a fluid temperature signal that is used by the electronic circuit in calculating the dielectric strength and the level of the fluid above the predetermined location as a function of temperature.

10. The sensor of claim 8 further comprising an input electrically connected to the electronic circuit, the input receiving an engine speed signal that is used by the electronic circuit in calculating the level of the fluid above the predetermined location.

11. The sensor of claim 8 wherein the housing includes at least one curved section.

12. The sensor of claim 8 further comprising a plurality of grooves disposed in the first inner capacitive plate to assist the fluid in contacting the first inner capacitive plate in a predetermined increment.

13. The sensor of claim 8 further comprising a circuit board assembly disposed within the housing and attached to the first inner capacitive plate and attached to the second inner capacitive plate, the circuit board assembly being adapted to position the first inner capacitance plate and the second inner capacitive plate with respect to the outer capacitive plate.

14. The sensor of claim 13 further comprising a plurality of guides disposed in the interior of the housing to position the circuit board assembly within the housing.

15. A method of determining a dielectric strength and a level of a fluid above a predetermined level in a container, the method comprising:

providing a linear capacitor disposed within the container to engage the fluid above the predetermined level, the linear capacitor having a first capacitance that is sensitive to the dielectric strength and to the level of the fluid above the predetermined level;

providing a compensator capacitor disposed within the container and immersed in the fluid, the compensator capacitor having a second capacitance that is sensitive to the dielectric strength of the fluid;

measuring the first capacitance of the linear capacitor;

measuring the second capacitance of the compensator capacitor;

calculating the dielectric strength of the fluid based upon the measured second capacitance;

outputting the calculated dielectric strength;

calculating the level of the fluid above the predetermined level, this calculating being performed substantially simultaneously with the calculating of the dielectric strength, and including, (a) providing a characteristic curve that relates the level of the fluid to a first frequency and a second frequency, (b) converting the first capacitance into the first frequency wherein the first frequency is inversely proportional to the first capacitance, (c) converting the second capacitance into the second frequency wherein the second frequency is inversely proportional to the second capacitance, and (d) determining the level of the fluid from the characteristic curve based Upon the first frequency and second frequency; and outputting the calculated level of the fluid above the predetermined level.

16. The method of claim 15 wherein calculating the dielectric strength of the fluid further comprises:

providing a characteristic curve that relates the dielectric strength of the fluid to a first frequency and a second frequency;

converting the first capacitance into the first frequency wherein the first frequency is inversely proportional to the first capacitance;

converting the second capacitance into the second frequency wherein the second frequency is inversely proportional to the second capacitance; and determining the dielectric strength of the fluid from the characteristic curve based upon the first frequency and the second frequency.

17. The method of claim 15 further comprising:

providing a profile of the container as a function of the level of the fluid above the predetermined level;

calculating the volume of the fluid based upon the profile and in response to calculating the level of the fluid above the predetermined level; and outputting the volume of the fluid as calculated.

18. The method of claim 15 further comprising:

measuring a temperature of the fluid to produce a temperature signal; and adjusting the level of the fluid above the predetermined level as calculated based upon the temperature signal in response to calculating the level of the fluid above the predetermined level.

19. The method of claim 15 further comprising:

receiving an engine speed signal; and adjusting the level of the fluid above the predetermined level as calculated based upon the engine speed signal in response to calculating the level of the fluid above the predetermined level.

20. A method of determining a dielectric strength and a level of a fluid above a predetermined level in a container, the method comprising:

providing a linear capacitor disposed within the container to engage the fluid above the predetermined level, the linear capacitor having a first capacitance that is sensitive to the dielectric strength and to the level of the fluid above the predetermined level;

providing a compensator capacitor disposed within the container and immersed in the fluid, the compensator capacitor having a second capacitance that is sensitive to the dielectric strength of the fluid;

measuring the first capacitance of the linear capacitor;

measuring the second capacitance of the compensator capacitor;

calculating the dielectric strength of the fluid based upon the measured second capacitance;

outputting the calculated dielectric strength;

calculating the level of the fluid above the predetermined level, this calculating being performed substantially simultaneously with the calculating of the dielectric strength and including, (a) providing a characteristic curve, the characteristic curve having a plurality of slopes that relate to a plurality of levels of the fluid above the predetermined level, a first focal point frequency associated with the first capacitance, and a second focal point frequency associated with the second capacitance, wherein the first and the second focal point frequencies are independent of the level of the fluid and independent of the dielectric strength of the fluid, (b) converting the first capacitance into a first frequency that is inversely proportional to the first capacitance, (c) calculating a difference between the first frequency and the first focal point frequency to produce a denominator, (d) converting the second capacitance into a second frequency that is inversely proportional to the second frequency, (e) calculating a difference between the second frequency and the second focal point frequency to produce a numerator, (f) calculating a ratio of the numerator to the denominator to produce a measured slope, and (g) converting the measured slope into the level of the fluid above the predetermined level based upon the plurality of slopes; and outputting the calculated level of the fluid above the predetermined level.

21. The method of claim 20 wherein the characteristic curve has a plurality of levels for a known dielectric strength, the first focal point frequency, and the second focal point frequency, the method further comprising calculating the plurality of slopes based upon the plurality of levels for the known dielectric strength, the first focal point frequency and the second focal point frequency prior to converting the measured slope into the level of the fluid above the predetermined level.

22. The method of claim 20 wherein calculating the dielectric strength of the fluid further comprises:

providing a scale factor, an offset, and a known characteristic of a known dielectric strength;

determining a known frequency from the measured slope and the known characteristic;

calculating a difference between the second frequency and the known frequency to produce a delta frequency;

calculating a product of the scale factor and the delta frequency to produce an intermediate result; and calculating a sum of the offset and the intermediate result to produce the dielectric strength.

23. The method of claim 20 further comprising:

comparing the ratio of the numerator to the denominator to a valid ratio range; and outputting an error signal in response to the ratio of the numerator to the denominator falling outside the valid ratio range.

24. The method of claim 20 further comprising:

comparing the first frequency with a valid first frequency band;

outputting an error signal in response to the first frequency being outside the valid first frequency band;

comparing the second frequency with a valid second frequency band; and outputting the error signal in response to the second frequency falling outside the valid second frequency band.

* * * * *